United States Patent [19]

Kitagawa et al.

[11] Patent Number: 5,367,455
[45] Date of Patent: Nov. 22, 1994

[54] RUNNING PERFORMANCE CONTROL APPARATUS AND METHOD FOR AN ELECTRIC VEHICLE

[75] Inventors: Masashi Kitagawa; Kenichiro Kimura; Takahiro Iwata, all of Wako, Japan

[73] Assignee: Honda Giken Kogyo Kabushiki Kaisha, Tokyo, Japan

[21] Appl. No.: 922,825

[22] Filed: Jul. 31, 1992

[30] Foreign Application Priority Data

Aug. 2, 1991 [JP] Japan .................................. 3-194406

[51] Int. Cl.$^5$ .............................................. B60K 6/00
[52] U.S. Cl. ............................... 364/424.01; 180/65.1
[58] Field of Search ................... 364/424.01; 180/167, 180/168, 169, 65.1

[56] References Cited

U.S. PATENT DOCUMENTS

| | | | |
|---|---|---|---|
| 4,862,364 | 8/1989 | Matsuda | 364/424.01 |
| 5,065,320 | 11/1991 | Hayashi | 364/424.01 |
| 5,176,213 | 1/1993 | Kawai et al. | 180/243 |
| 5,257,190 | 10/1993 | Crane | 364/424.03 |

FOREIGN PATENT DOCUMENTS

| | | |
|---|---|---|
| 56-30524 | 7/1981 | Japan . |
| 57-53702 | 11/1982 | Japan . |
| 62-241733 | 10/1987 | Japan . |
| 63-61360 | 4/1988 | Japan . |
| 63-77302 | 4/1988 | Japan . |
| 63-255152 | 10/1988 | Japan . |
| 63-284052 | 11/1988 | Japan . |

Primary Examiner—Thomas G. Black
Assistant Examiner—Susan Wieland
Attorney, Agent, or Firm—Lyon & Lyon

[57] ABSTRACT

A running performance control apparatus suitable for use in an electric vehicle, which is capable of restricting the running performance of the vehicle when the capacity of a battery of the vehicle is reduced to the preset residual capacity. The battery capacity reduced to the preset residual capacity is detected and a vehicle running state including the speed of a running vehicle and the acceleration of the vehicle, is detected. An operating state, including shift positions of a transmission of the vehicle and the degree of opening of a vehicle accelerator is detected. When the battery capacity is reduced to the preset residual capacity, it is determined whether the vehicle running state should be restricted. If the answer is determined to be Yes, then information indicative of the contents of a desired restriction datum of the running performance can be read from a storing device storing a plurality of restriction data each used to restrict the running performance of the vehicle on the basis of information indicative of the running state detected by a running state detecting device, and of information indicative of the operating state detected by an operating state detecting device, thereby making it possible to restrict the running performance of the vehicle.

21 Claims, 9 Drawing Sheets

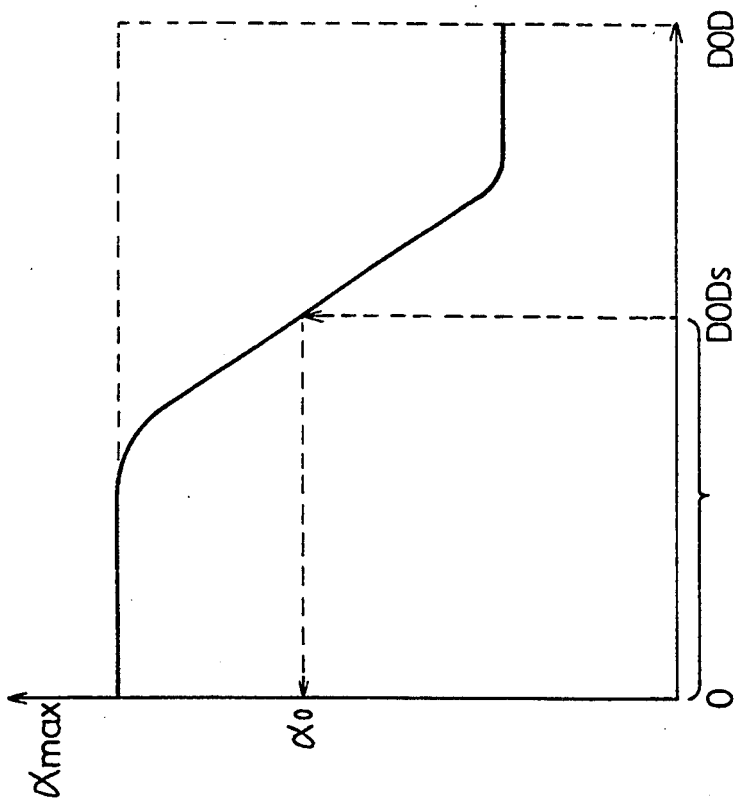
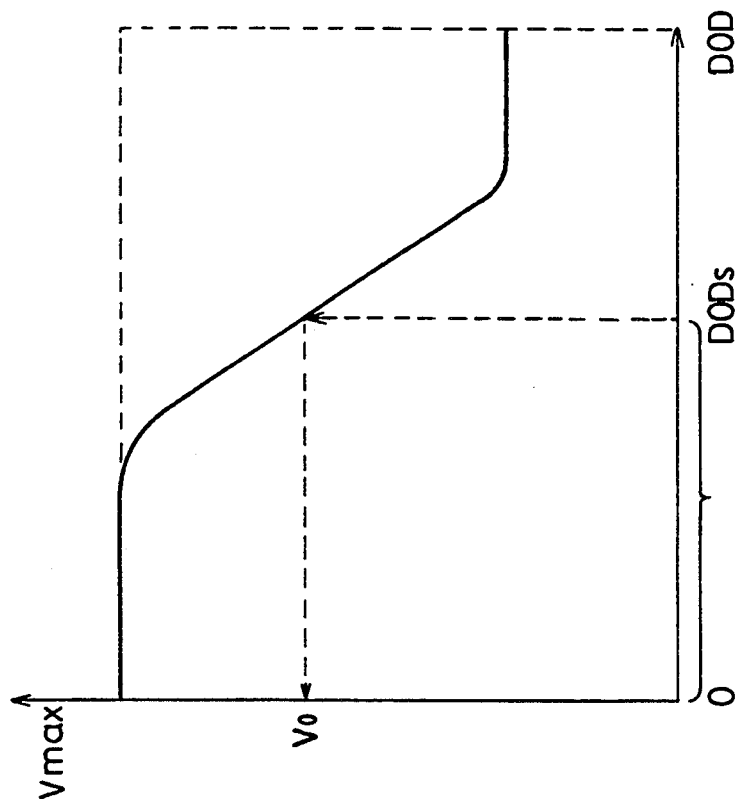

FIG.10

| | \ | OPERATING STATE OF DRIVEN VEHICLE | | | | | |
|---|---|---|---|---|---|---|---|
| | | I | II | III | IV | V | VI |
| RUNNING STATE | I | — | — | B | × | × | × |
| | II | — | — | B | A | × | × |
| | III | — | — | × | A | A | — |
| | IV | × | × | B | × | × | × |
| | V | × | × | B | — | — | — |
| | VI | × | × | × | — | — | — |
| | VII | × | × | × | — | — | C |

A : RESTRICTION OF MAXIMUM SPEED
B : RESTRICTION OF MAXIMUM ACCELERATION
C : RESTRICTION OF BOTH MAXIMUM SPEED AND MAXIMUM ACCELERATION
× : IMPROBABLE ASPECTS
— : NON-RESTRICTION ASPECTS

RUNNING PERFORMANCE CONTROL APPARATUS AND METHOD FOR AN ELECTRIC VEHICLE

BACKGROUND OF THE INVENTION

1. Field of the Invention

The present invention relates to a running performance control apparatus suitable for use in an electric vehicle, which is capable of determining, based on a driver's choice, whether the running performance of the vehicle while being driven should be restricted when the capacity of a battery used for the running of the electric vehicle is reduced to a predetermined value.

2. Description of the Related Art

It has recently been pointed out that the environment is deteriorating due to noise and exhaust gases produced by gasoline vehicles. Therefore, a strong demand is now arising for wide use of electric vehicles as a countermeasure for solving such environmental problems.

Since this type of electric vehicle is normally driven by electric energy stored in a battery, the vehicle is provided with a large battery. However, the continuous running distance over which tile electric vehicle can be driven by one charge level is shorter than that obtained by a gasoline vehicle. Therefore, a method of efficiently using the capacity of a battery is an important consideration.

When a battery develops trouble and electric power outputted from the faulty battery is reduced, for example, an electric vehicle is apt to abruptly stop running before it reaches a desired destination when the electric vehicle runs under the action of the electric power outputted from the battery which is at fault.

In order to solve such a problem, a technique for comparing a normal battery voltage with an actual battery voltage in view of improper variations in the battery voltage due to a failure in a valve, and for determining a torque command value for a motor based on the result of the comparison so as to reduce the torque outputted from the motor, thereby making it possible to increase a vehicle drivable distance under the action of the defective battery, has been disclosed in Japanese Patent Application Laid-Open Publication No. 63-77302, for example.

However, the method which is employed in the above prior art has the problem that the running state is not controlled to provide the running state corresponding to the running environment at all times because whether the running environment of a running vehicle falls into either an express highway or an urban district area has not been taken into consideration.

SUMMARY OF THE INVENTION

It is a general object of the present invention to provide a running performance control apparatus suitable for use in an electric vehicle, which is capable of restricting running performance to the optimum level based on a running state immediately preceding the present running state when the capacity of the battery is reduced to the preset residual capacity during running of the vehicle and the restriction of the running performance begins, and determining, based on a driver's choice, whether the restriction of the running performance should begin, thereby making it possible to restrict the running state to the most suitable level.

It is a principal object of the present invention to provide a running performance control apparatus suitable for use in an electric vehicle, the running performance control apparatus being used to restrict the running performance of the vehicle when the capacity of a battery employed in the vehicle is reduced to the preset residual capacity, the running performance control apparatus comprising detecting means for detecting that the battery capacity is reduced to the preset residual capacity, running state detecting means for detecting the vehicle running state including the speed of the running vehicle and the acceleration of the vehicle, operating state detecting means for detecting an operating state including shift positions of the transmission of the vehicle and the degree of opening of the vehicle accelerator, storing means for storing therein the contents of a plurality of restriction data each used to restrict the running performance of the vehicle, determining means for selectively determining whether the running state of the vehicle should be restricted when the battery capacity is reduced to the preset residual capacity, and running performance controlling means for reading information indicative of the contents of one restriction datum for restricting the running performance from the storing means based on information indicative of the running state detected by the running state detecting means and information indicative of the operating state detected by the operating state detecting means when the determining means determines that the running state of the vehicle should be restricted, thereby restricting the running performance of the vehicle.

It is another object of the present invention to provide a running performance control apparatus suitable for use in an electric vehicle, the running performance control apparatus being used to restrict the running performance of the vehicle when the capacity of a battery employed in the vehicle is reduced to the preset residual capacity, the running performance control apparatus comprising detecting means for detecting that the battery capacity is reduced to the preset residual capacity, running state detecting means for detecting the vehicle running state including the speed of a running vehicle and the acceleration of the vehicle, operating state detecting means for detecting an operating state including shift positions of the transmission of the vehicle and the degree of opening of the vehicle accelerator, storing means for storing therein the contents of a plurality of restriction data each used to restrict the running performance of the vehicle, and running performance controlling means for reading the contents of one restriction datum for restricting the running performance from the storing means based on information indicative of the running state detected by the running state detecting means add information indicative of the operating state detected by the operating state detecting means when the battery capacity detected by the detecting means is reduced to the preset residual capacity, thereby restricting the running performance of the vehicle.

It is a further object of the present invention to provide a running performance control apparatus of this type wherein the detecting means comprises a depth-of-discharge sensor for detecting the depth of discharge of the battery and a converter circuit for converting the output of the depth-of-discharge sensor into data on the residual capacity of the battery.

It is a still further object of the present invention to provide a running performance control apparatus of this type wherein the converter circuit can detect a plurality of residual capacities which differ from one another.

It is a still further object of the present invention to provide a running performance control apparatus of this type wherein the running state detecting means comprises a vehicle speed sensor for detecting the running speed of the vehicle and an acceleration sensor for detecting the acceleration of the running vehicle.

It is a still further object of the present invention to provide a running performance control apparatus of this type wherein the operating state detecting means comprises a shift position sensor for detecting each of the shift positions of the transmission and a degree-of-opening-of-accelerator sensor for detecting the degree of opening of the accelerator.

It is a still further object of the present invention to provide a running performance control apparatus of this type wherein each of the contents stored in the storing means represents any one of an aspect of the restriction of the maximum speed of the vehicle, an aspect of the restriction of the maximum acceleration of the vehicle, an aspect of the restriction of both the maximum speed and the maximum acceleration, and an aspect of the non-restriction of the maximum speed and the maximum acceleration.

It is a still further object of the present invention to provide a method of controlling a running performance of an electric vehicle having a battery and a transmission, when the capacity of the battery is reduced to a preset residual capacity, comprising the steps of detecting that the capacity of the battery is reduced to the preset residual capacity, detecting a vehicle running state including a speed of the vehicle while being driven and an acceleration of the vehicle, detecting an operating state including shift positions of a transmission of the vehicle and tile degree of opening of the vehicle accelerator, storing the contents of a plurality of restriction data each used to restrict the running performance of the vehicle, selectively determining whether the running state of the vehicle should be restricted when the battery capacity is reduced to the preset residual capacity, reading information indicative of the stored contents of one restriction datum for restricting the running performance based on information indicative of the running state and reading information indicative of the operating state when it has been selectively determined that the running state of the vehicle should be restricted, and restricting the running performance of the vehicle in response to the read information.

It is a still further object of the present invention to provide a method of controlling the running performance of an electric vehicle having a battery and transmission, wherein the detecting of the capacity of the battery includes detecting the depth of discharge of the battery and converting the detected depth-of-discharge into data on the residual capacity of the battery.

It is a still further object of the present invention to provide a method of controlling the running performance of an electric vehicle having a battery and transmission, wherein the converting step converts a plurality of residual capacities of the battery which differ from one another.

It is a still further object of the present invention to provide a method of controlling the running performance of an electric vehicle having a battery and transmission, wherein each of the contents stored in the storing step represents any one of an aspect of the restriction of the maximum speed of the vehicle, an aspect of the restriction of the maximum acceleration of the vehicle, an aspect of the restriction of both the maximum speed and the maximum acceleration, and an aspect of the non-restriction of the maximum speed and the maximum acceleration.

It is a still further object of the present invention to provide a running performance control apparatus suitable for use in an electric vehicle, the running performance control apparatus being used to restrict the running performance of the vehicle when the capacity of a battery employed in the vehicle is reduced to a preset residual capacity, the running performance control apparatus comprising means for determining that the battery is reduced to the preset residual capacity, means for determining a vehicle running state including a speed of the vehicle and an acceleration of the vehicle, means for storing restriction data used to restrict the running performance of the vehicle, and control means for reading one of the restriction data from the storing means based on information indicative of the running state determined by the running state determining means when the battery capacity determined by the battery capacity determining means is reduced to the preset residual capacity, and for restricting the running performance of the vehicle in response to the one restriction data.

It is a still further object of the present invention to provide a running performance control apparatus, wherein operating state determining means are provided for determining each of the shift positions of a transmission and a degree of opening of an accelerator of the vehicle, and the control means reading is also based on information determined by the operating state determining means.

It is a still further object of the present invention to provide a running performance control apparatus, wherein means are provided for a driver of the vehicle to selectively prevent the restriction on the running performance of the vehicle.

It is a still further object of the present invention to provide a running performance control apparatus, wherein the restriction data stored in the storing means represents any one of an aspect of the restriction of the maximum speed of the vehicle, an aspect of the restriction of the maximum acceleration of the vehicle, an aspect of the restriction of both the maximum speed and the maximum acceleration, and an aspect of the non-restriction of the maximum speed and the maximum acceleration.

It is a still further object of the present invention to provide a running performance control apparatus, wherein means are provided for indicating to a driver of the vehicle which aspect of the restriction on the running of the vehicle has been imposed by the control means.

It is a still further object of the present invention to provide a running performance control apparatus, wherein means are provided for the driver to selectively prevent the restriction on the running performance of the vehicle.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIGS. 7(a) and 7(b) are graphs for describing a look-up table (LUT) used to read or determine the maximum limit speed and the maximum limit acceleration from data indicative of the remaining capacity of the battery of the running vehicle by the running performance control apparatus;

FIG. 10 is a diagram for describing a LUT used to read data for restricting the running performance from data indicative of the vehicle's running state determined in FIG. 8 and data indicative of the vehicle's operating state determined in FIG. 9.

DETAILED DESCRIPTION OF THE PREFERRED EMBODIMENTS

Figure 1:
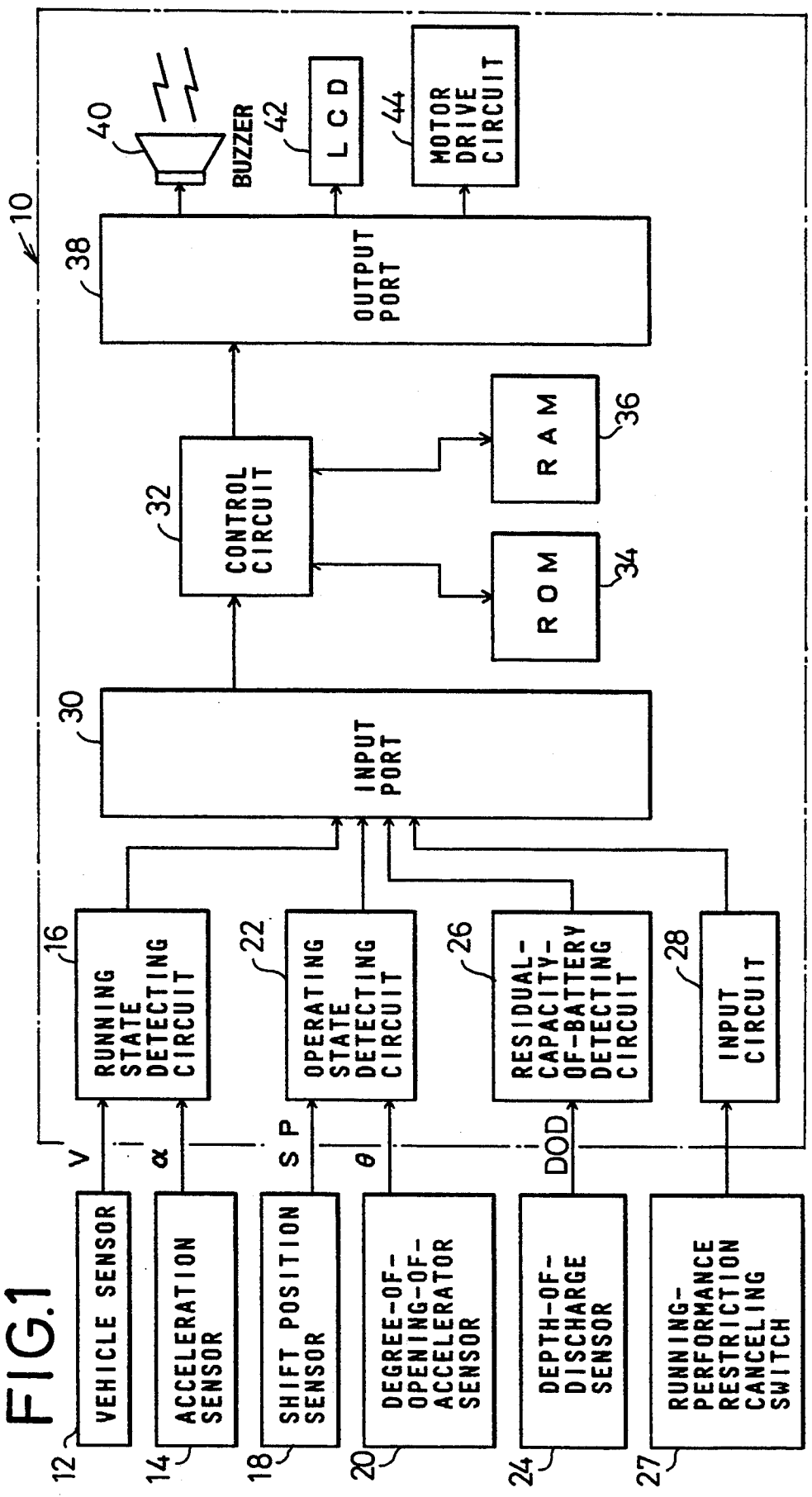
FIG. 1 is a block diagram showing the structure of a running performance control apparatus according to one embodiment of the present invention.
Figure 2:
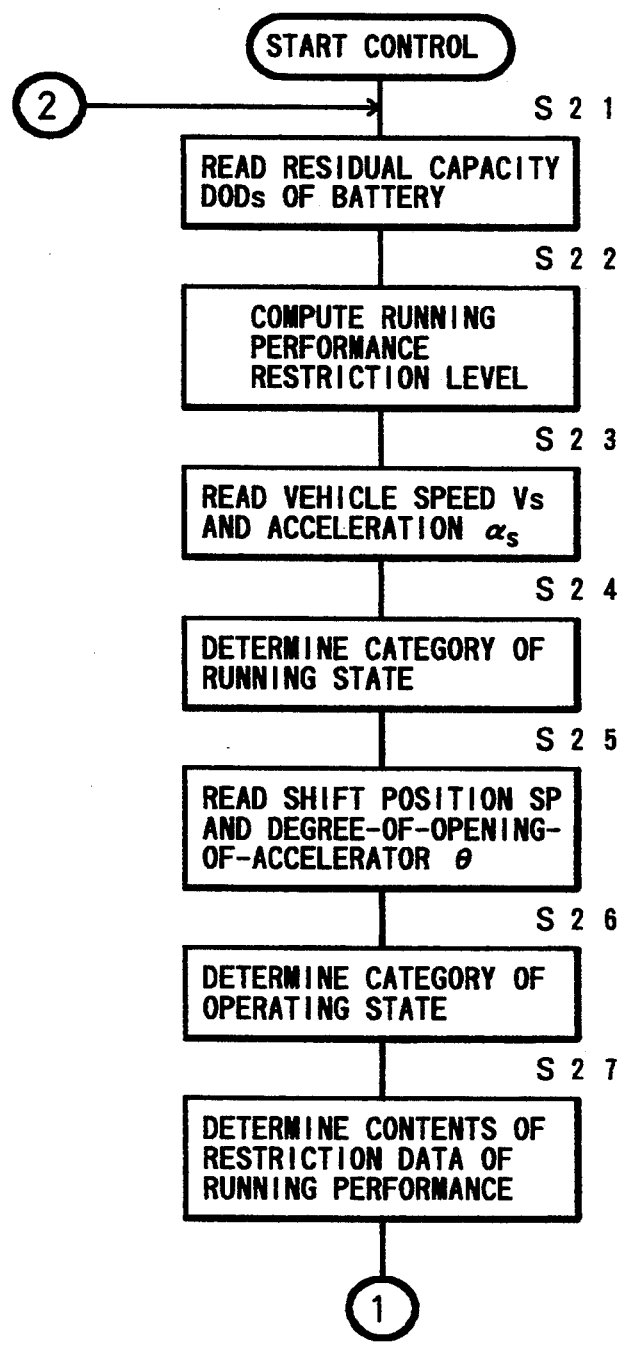
FIG. 2 is a flowchart for describing a procedure for restricting running performance of an electric vehicle while being driven, by the running performance control apparatus shown in FIG. 1.
Figure 3:
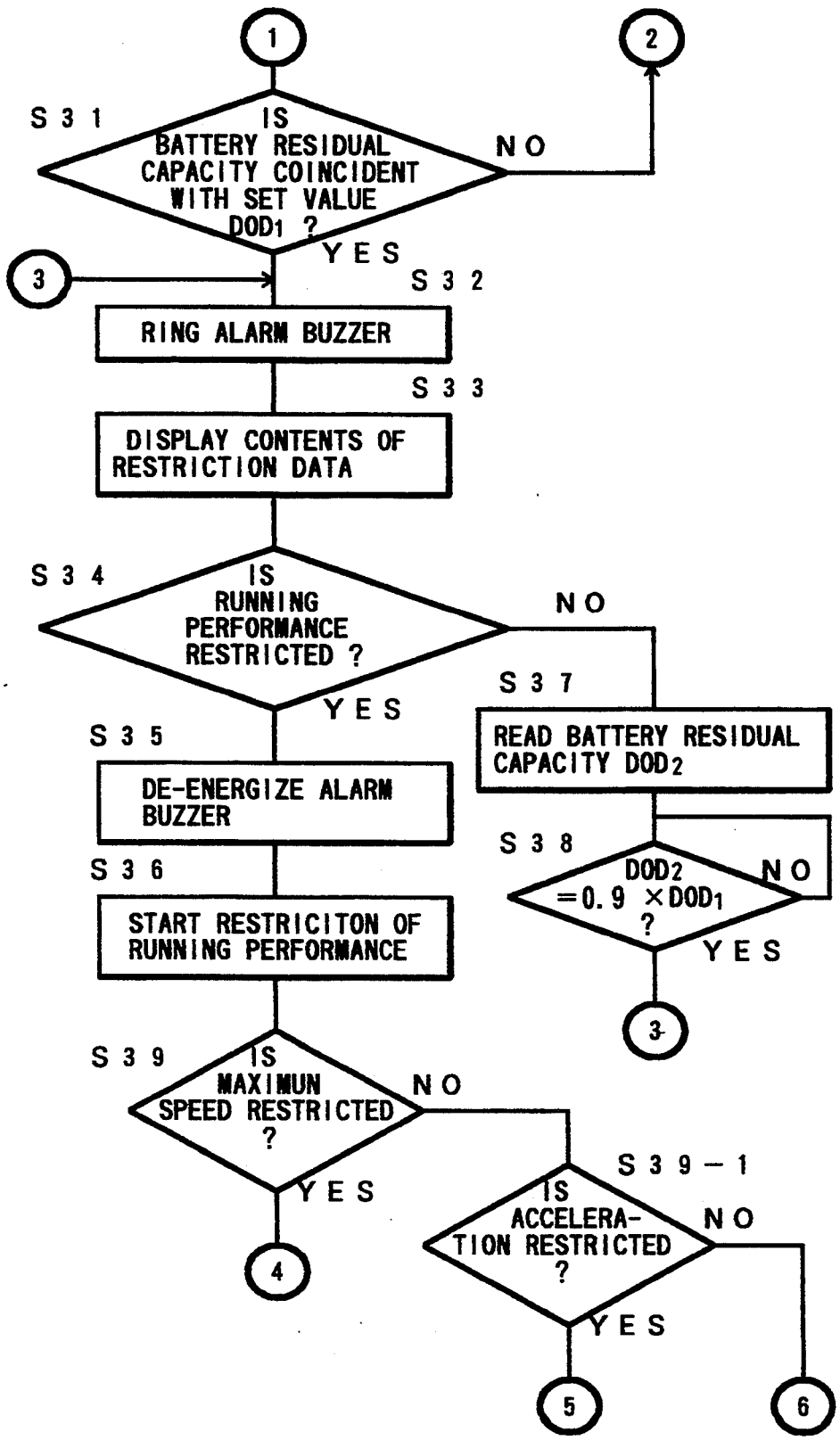
FIG. 3 is a flowchart for describing another procedure for restricting the running performance of the vehicle by the running performance control apparatus.
Figure 4:
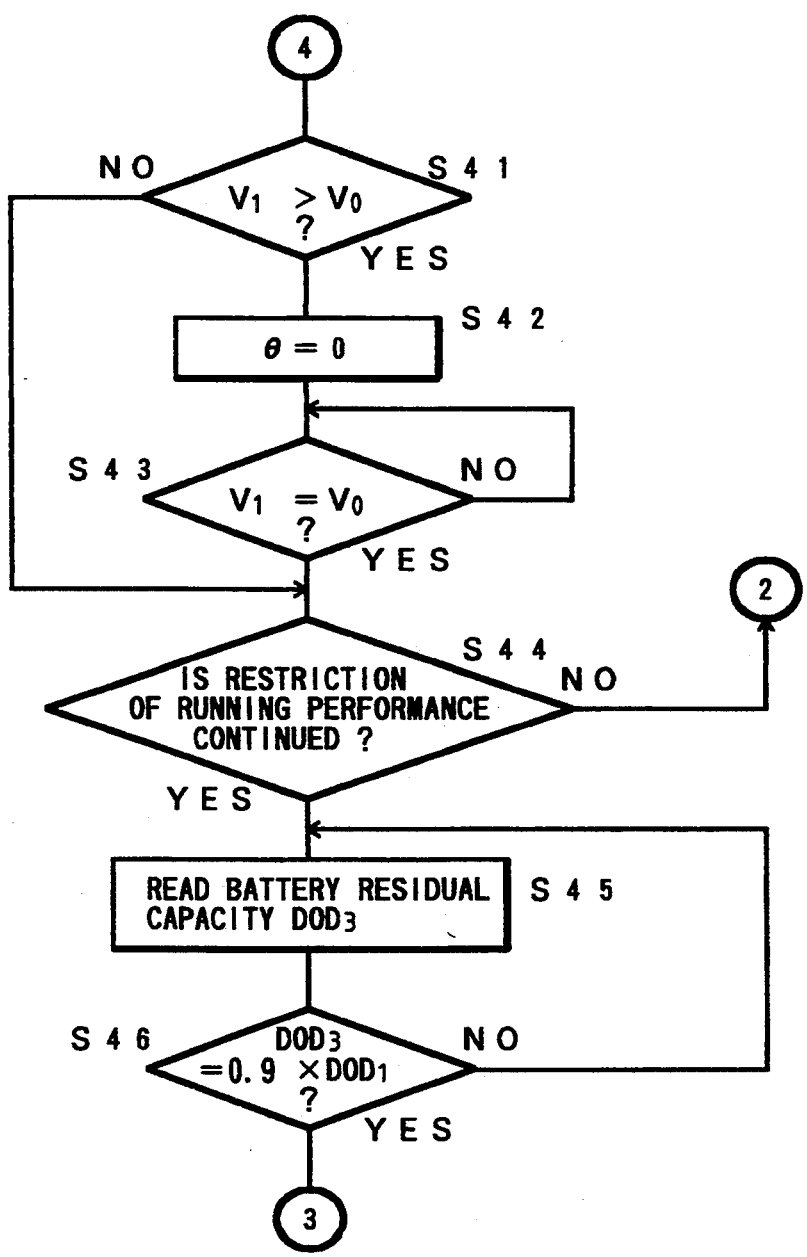
FIG. 4 is a flowchart for describing a further procedure for restricting the running performance of the vehicle by the running performance control apparatus.
Figure 5:
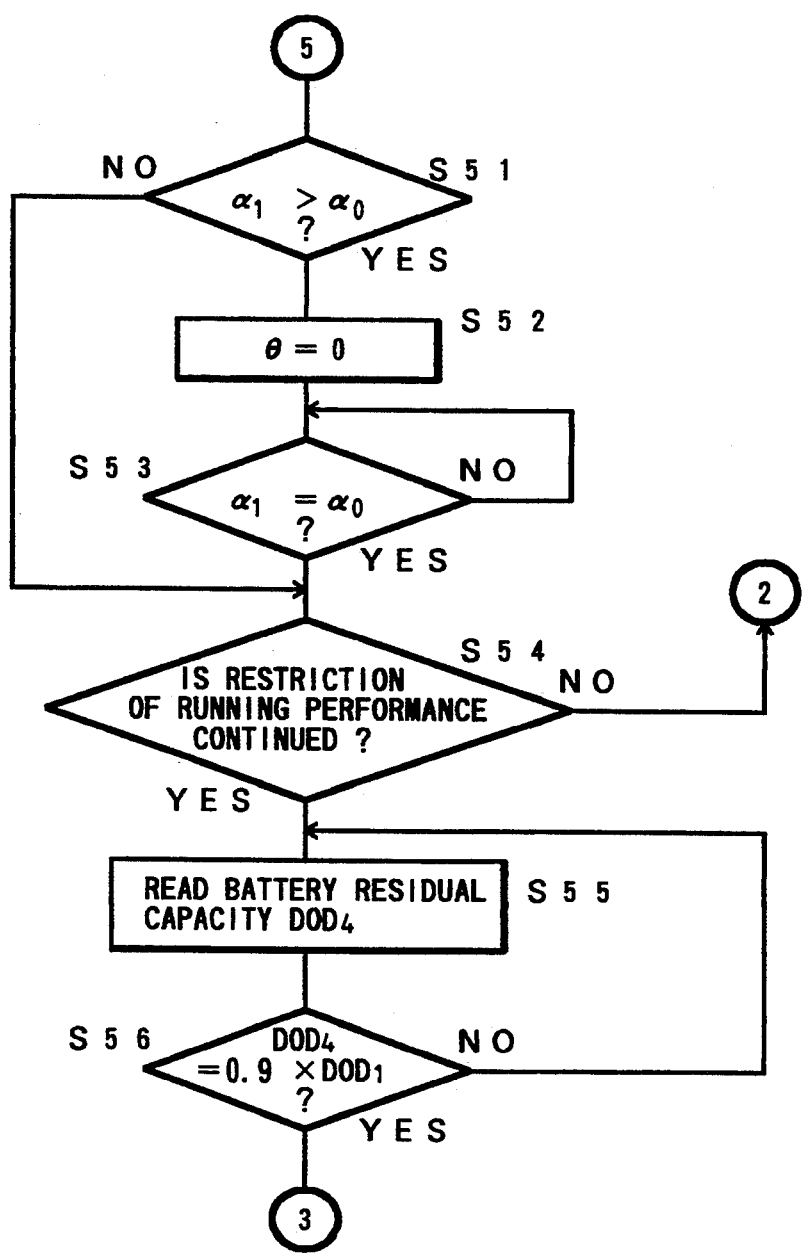
FIG. 5 is a flowchart for describing a still further procedure for restricting the running performance of the vehicle by the running performance control apparatus.

FIG. 1 is a block diagram showing the structure of a running performance control apparatus according to one embodiment of the present invention.

In FIG. 1, reference numeral 10 indicates a running performance control apparatus for an electric vehicle (not shown). The running performance control apparatus 10 comprises a running state detecting circuit 16 for reading or detecting signals output from a vehicle speed sensor 12 and an acceleration sensor 14, an operating state detecting circuit 22 for detecting signals output from a shift position sensor 18 and a degree-of-opening-of-accelerator sensor 20, a residual-capacity-of-battery detecting and converting circuit 26 for detecting a signal output from a depth-of-discharge (hereinafter called "DOD") sensor 24 used to detect a discharged state of the main vehicle battery (not shown) and for converting the detected signal into data on the remaining capacity of the battery, an input circuit 28 for receiving a signal output from a running-performance restriction canceling switch 27 used to input information about a selective determination to be made by the driver of the vehicle as to whether the running performance of the electric vehicle should be restricted, and an input port 30 used for these circuits.

Further, the running performance control apparatus 10 comprises a control circuit 32 for restricting the running performance of the vehicle, a ROM 34 for storing therein a program used to restrict the running performance of the vehicle, and a plurality of look-up tables (hereinafter called "LUTs"), a RAM 36 for temporarily storing therein data under the control of the control circuit 32, an output port 38 used for the control circuit 32, a buzzer 40 serving as a warning sound producing means, which is electrically connected to the output port 38, a liquid crystal display (LCD) 42 serving as a display device, and a motor drive circuit 44 for energizing an unillustrated motor used to run or drive the vehicle.

Operations and effects for restricting the running performance of the vehicle by the running performance control apparatus 10 constructed as described above will be described in detail with reference to FIGS. 1 through 10.

When the vehicle starts running, the control circuit 32 reads the remaining capacity DODs (DOD at start) of a battery from the residual-capacity-of-battery detecting and converting circuit 26 via the input port 30 (Step S21, see FIG. 2), and determines a running performance restriction level from the remaining capacity DODs.

More specifically, the maximum limit speed $V_0$ corresponding to the residual capacity DODs of the battery is read from a LUT (see FIG. 7(a)) representing a relationship between the residual capacity DOD of the battery and the maximum speed Vmax previously stored in the ROM 34. The maximum limit speed $V_0$ thus read is then stored in the RAM 36. In addition, the maximum limit acceleration $a_0$ corresponding to the residual capacity DODs is read from a LUT (see FIG. 7(b)) showing a relationship between the remaining capacity DOD of the battery and the maximum acceleration $a_{max}$. The maximum limit acceleration $a_0$ thus read is then stored in the RAM 36 (Step S22).

Next, the control circuit 32 reads a vehicle speed Vs of a running vehicle detected by the vehicle speed sensor 12 and an acceleration $a_s$ of the running vehicle detected by the acceleration sensor 14 via the running state detecting circuit 16 and the input port 30 (Step S23). Thereafter, one desired LUT previously stored in the ROM 34 is read based on the vehicle speed Vs and the acceleration $a_s$, thereby determining that, for example, the vehicle is running in an urban district area (see a point S in FIG. 8) indicated by the number II (Step S24).

Further, the control circuit 32 reads a shift position SP of a lever for shifting the transmission (not shown), e.g., a second gear speed, and the degree of opening of an accelerator $\theta$ from the operating state detecting circuit 22 via the input port 30 (Step S25). Then, the control circuit 32 reads a desired LUT based on both the shift position SP and the degree of the opening of the accelerator $\theta$ and determines that, for example, the operating state of the running vehicle falls under the category of a suburb (see a point K in FIG. 9) indicated by the number IV (Step S26).

Next, the control circuit 32 determines or calculates restriction data A for restricting the running performance of the vehicle from the LUT stored in the ROM 34 based on the number II as data indicative of the running state of the vehicle, which has been read in Step S24 and the number IV as data indicative of the operating state, which has been read in Step S26 (see FIG. 10). The restriction data A is used to restrict only the maximum speed of the vehicle without restricting the maximum acceleration of the vehicle. That is, the maximum speed of the vehicle is restricted to the maximum limit speed $V_0$ determined in Step S22 (Step S27).

Thus, the restriction data A for restricting the running performance of the vehicle has been obtained. However, the calculation of the restriction data A is carried out repeatedly until the remaining capacity DODs of the battery, which has been determined from the depth-of-discharge sensor 24 by the residual-capacity-of-battery detecting and converting circuit 26, is reduced to a set value $DOD_1$ which has been previously set in the ROM 34. The restriction data A is brought up to date for each calculation and stored in the RAM 36.

When the remaining capacity DODs detected by the residual-capacity-of-battery detecting and converting circuit 26 is reduced to the set value $DOD_1$ (Step S31, see FIG. 3), the control circuit 32 is activated to energize the buzzer 40 via the output port 38, thereby producing a warning sound (Step S32). The contents of the latest restriction data read from the LUT shown in FIG. 10 and stored in the RAM 36 are displayed and blinked on the LCD 42 (Step S33).

Next, the control circuit 32 determines whether the running-performance restriction canceling switch 27 has been operated by the driver (Step S34). When the running-performance restriction canceling switch 27 is operated during a predetermined period, the control circuit 32 stops the buzzer 40 from ringing (Step S35) and starts restricting the running performance (Step S36).

If the answer is determined to be No in Step S34, then the control circuit 32 is activated to cause the residual-capacity-of-battery detecting and converting circuit 26 to read the present remaining capacity $DOD_2$ from the depth-of-discharge sensor 24 (Step S37). When the read remaining capacity $DOD_2$ is reduced to a value corresponding to 90% of the remaining capacity $DOD_1$ read in Step S31 (Step S38), the procedure is returned to Step S32 where the buzzer 40 is energized to ring.

On the other hand, the control circuit 32 determines whether the contents of the latest restriction data determined in Step S27 represent information indicative of the restriction of the maximum speed (Step S39). If the answer is determined to be Yes (see "A" in FIG. 10), then the control circuit 32 reads the present vehicle speed $V_1$ from the running state detecting circuit 16 and determines whether the present vehicle speed $V_1$ is faster than the maximum limit speed $V_0$ (Step S41, see FIG. 4). If the answer is determined to be Yes (i.e., $V_1 > V_0$), then the degree of opening of the accelerator $\theta$ is set to "0" to restrain the speed of the vehicle (Step S42). The running speed of the vehicle is restrained until the present vehicle speed $V_1$ coincides with the maximum limit speed $V_0$ (i.e., $V_1 = V_0$) (Step S43).

When the running speed $V_1$ of the vehicle is restricted to the maximum limit speed $V_0$, the control circuit 32 is activated to cause the input circuit 28 to read the state of the running-performance restriction canceling switch 27 again (Step S44). If the state of the running-performance restriction canceling switch 27 represents that the restriction of the running performance continues, then the control circuit 32 reads the present remaining capacity $DOD_3$ of the battery (Step S45) and determines whether the present remaining capacity $DOD_3$ is of the value corresponding to 90% of the remaining capacity $DOD_1$ read in Step S31 (Step S46). If the answer is determined to be Yes in Step S46, then the routine procedure is returned to Step S32 where the buzzer 40 is energized to buzz.

If the answer is determined to be No in Step S41, then the control circuit 32 determines in Step S44 whether the restriction of the running performance should be carried out continuously. If the state of the running-performance restriction canceling switch 27, which has been read by the control circuit 32 in Step S44, represents that the restriction of the running performance be discontinued, then the routine procedure is returned to Step S21 as the initial control step.

If, on the other hand, the result of the determination in Step S27 does not represent the restriction of the maximum speed, it is then determined whether the latest restriction data of the running performance, which has been determined in Step S27, represents data used to restrict an acceleration $\alpha$ (Step S39-1). If the answer is determined to be Yes (see "B" in FIG. 10), then tile control circuit 32 reads the present acceleration $\alpha_1$ from the running state detecting circuit 16 and determines whether the present acceleration $\alpha_1$ is greater than the maximum limit acceleration $\alpha_0$ (Step S51, see FIG. 5). If the answer is determined to be Yes (i.e., $\alpha_1 > \alpha_0$), then the degree of opening of the accelerator $\theta$ is set to "0" to restrain the speed of the vehicle (Step S52). The running speed of the vehicle is restrained until the present acceleration $\alpha_1$ coincides with the maximum limit acceleration $\alpha_0$ (i.e., $\alpha_1 = \alpha_0$) (Step S53).

When the acceleration $\alpha_1$ of the vehicle is restricted to the maximum limit acceleration $\alpha_0$, the control circuit 32 is activated to cause the input circuit 28 to read the state of the running-performance restriction canceling switch 27 again (Step S54). If the state of the running-performance restriction canceling switch 27 represents that the restriction of the running performance continues, then the control circuit 32 reads the present remaining capacity $DOD_4$ of the battery (Step S55) and determines whether the read remaining capacity $DOD_4$ is of the value corresponding to 90% of the remaining capacity $DOD_1$ read in Step S31 (Step S56). If tile answer is determined to be Yes in Step S56, then the routine procedure is returned to Step S32 where the buzzer 40 is energized to ring.

If the answer is determined to be No in Step S51, then the control circuit 32 determines in Step S54 whether the restriction of the running performance should be carried out continuously. If the state of the running-performance restriction canceling switch 27, which has been read by the control circuit 32 in Step S54, represents that the restriction of the running performance be discontinued, then the routine procedure is returned to Step S21 as the initial control step.

If the result of the determination in Step S39-1 does not represent the restriction of the acceleration $\alpha$, it is then determined that the latest restriction data of the running performance, which has been determined in Step S27, represents data used to restrict the maximum speed and the maximum acceleration (see "C" in FIG. 10).

Figure 6:
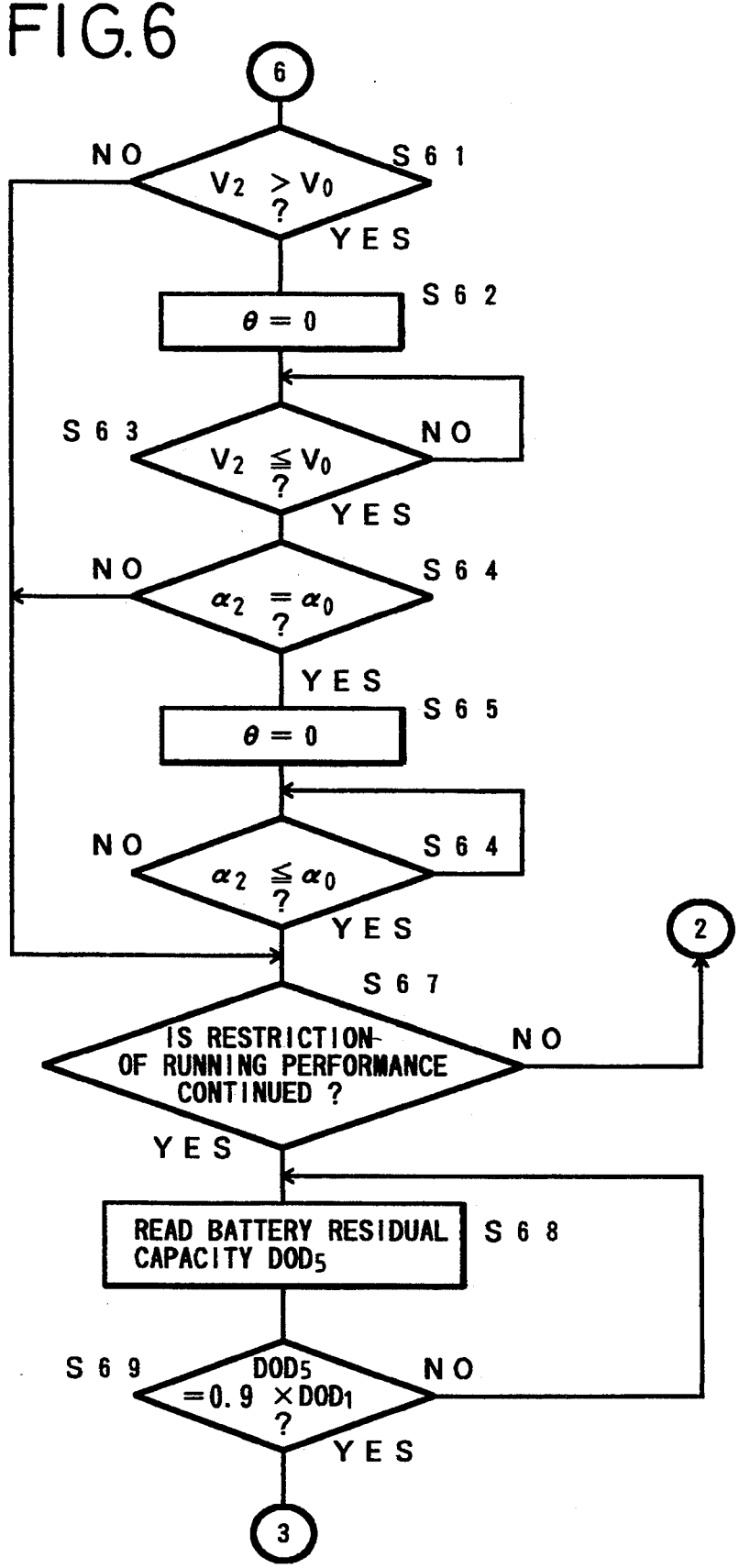
FIG. 6 is a flowchart for describing a still further procedure for restricting the running performance of the vehicle by the running performance control apparatus.
Figure 8:
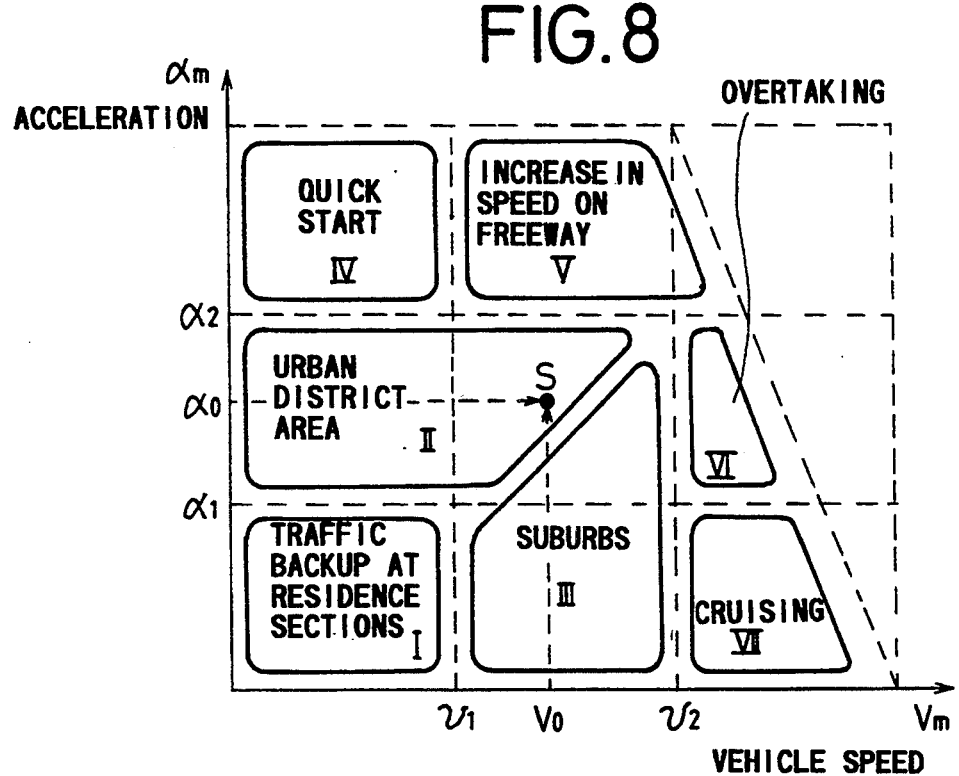
FIG. 8 is a diagram for describing a LUT used to determine a running state of the vehicle from data indicative of both the speed and the acceleration of the vehicle by the running performance control apparatus.
Figure 9:
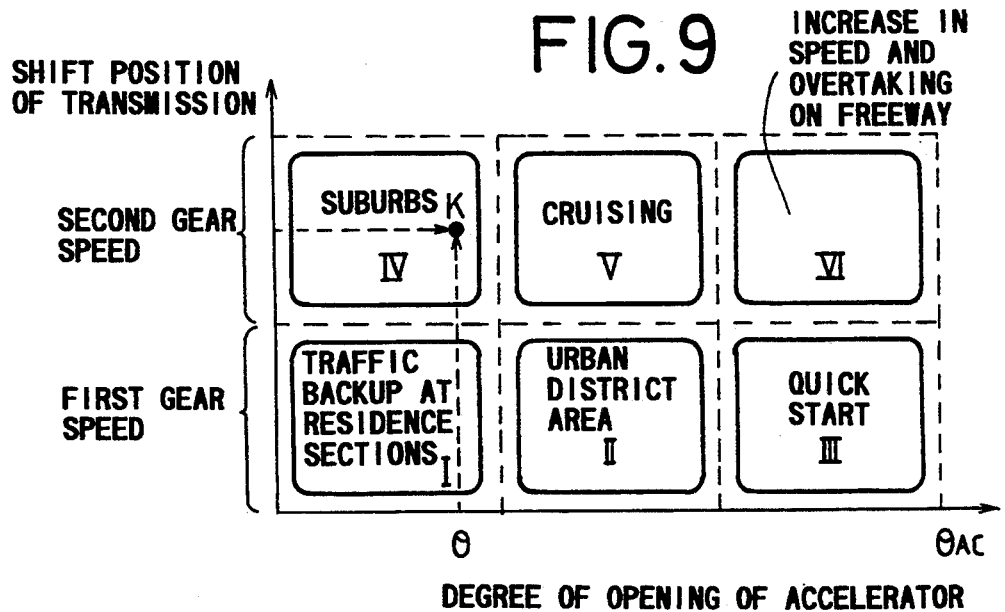
FIG. 9 is a diagram for describing a LUT used to determine an operating state of the running vehicle from data indicative of the degree of opening of the accelerator and the shift positions of the transmission by the running performance control apparatus.

The present vehicle speed $V_2$ is reduced to the maximum limit speed $V_0$ in a manner similar to the process executed in each of Steps S41 through S43 (Steps S61 through S63, see FIG. 6). Next, the present acceleration $\alpha_2$ of the vehicle is brought into agreement with the maximum limit acceleration $\alpha_0$ in a manner similar to the process executed in each of Steps S51 through S53 (Steps S64 through S66). It is then determined, based on a driver's choice, whether these restrictions should be carried out continuously (Step S67). If the answer is determined to be Yes in Step S67, then the present remaining capacity $DOD_5$ of the battery is read (Step S68). When the read remaining capacity $DOD_5$ coincides with the value corresponding to 90% of the remaining capacity $DOD_1$ read in Step S31 (Step S69), the routine procedure is returned to Step S32 where the buzzer 40 is energized to produce a buzzing sound.

According to the present embodiment, as described above, when the remaining capacity DODs of the battery of the vehicle while being driven is reduced to the preset remaining capacity $DOD_1$ (Step S31), the buzzer 40 is activated to ring (Step S32) and the contents of the restriction data are displayed on the LCD 42 (Step S33). Then, the driver is urged to make a decision as to whether the restriction of the running performance should be carried out (Step S34). If the answer is determined to be Yes in Step S34, then the restriction of the running performance is made.

Further, when the running performance of the vehicle is limited to a target restriction state, it is determined, based on a driver's choice, whether the restriction of the running performance should be carried out continuously. Thus, the driver's circumstantial judgments made depending on running environments can be adopted for control without automatically and uniformly restricting the running state according to the residual capacity of the battery, thereby making it possible to provide the restriction of the running performance most suitable for the running state.

In the running performance control apparatus according to the present invention, which is used in the electric vehicle, the running performance of the vehicle while being driven is restricted based on the contents of the restriction data of the running performance, which are obtained from information indicative of the running state of the vehicle and information indicative of the operating state. It is therefore possible to provide the restriction of the most suitable running performance based on the running state just before the present running state.

Further, when the running performance of the vehicle is restricted, information can be read indicative of a decision to be made as to whether the running performance, input via the inputting means by the driver, should be restricted, and a selective decision can be made in accordance with the read information as to whether the restriction of the running performance should be carried out. Therefore, the restriction of the optimum running performance can be made, to which a consideration as to the running environments has been given.

Having now fully described the invention., it will be apparent to those skilled in the art that many changes and modifications can be made without departing from the spirit or scope of the invention as set forth herein.

What is claimed is:

1. A running performance control apparatus for use in an electric vehicle, wherein said running performance control apparatus restricts the running performance of the vehicle when a capacity of a battery employed in the vehicle is reduced to a preset residual capacity, said running performance control apparatus comprising:

battery capacity detecting means for detecting that said battery capacity is reduced to said preset residual capacity;

speed detecting means for detecting a speed of the vehicle while being driven;

acceleration detecting means for detecting an acceleration of the vehicle;

running state determining means for determining a vehicle running state based on detected values from said speed detecting means and said acceleration detecting means;

shift position detecting means for detecting a shift position of a transmission of the vehicle;

accelerator opening detecting means for detecting a degree of opening of an accelerator of the vehicle;

operating state determining means for determining an operating state based on detected values from said shift position detecting means and said accelerator opening detecting means;

storing means for storing therein a plurality of restriction data each used to restrict the running performance of the vehicle;

restriction determining means for selectively determining whether the running state of the vehicle should be restricted when said battery capacity is reduced to said preset residual capacity; and running performance controlling means for reading information indicative of at least one restriction datum for restricting the running performance from said storing means based on information indicative of the running state determined by said running state determining means and on information indicative of the operating state determined by said operating state determining means when said restriction determining means determines that the running state of the vehicle should be restricted, and for restricting the running performance of the vehicle in response to said read information.

2. A running performance control apparatus according to claim 1, wherein said battery capacity detecting means comprises a depth-of-discharge sensor for detecting the depth of discharge of said battery and a converter circuit for converting the output of said depth-of-discharge sensor into data on the residual capacity of the battery.

3. A running performance control apparatus according to claim 2, wherein said converter circuit can detect a plurality of residual capacities of said battery which differ from one another.

4. A running performance control apparatus according to claim 1, 2, or 3, wherein said running state determining means comprises said speed detecting means and said acceleration detecting means.

5. A running performance control apparatus according to claim 1, 2, or 3, wherein said operating state determining means comprises said shift position detecting means and said accelerator opening detecting means.

6. A running performance control apparatus according to claim 1, 2, or 3, wherein each of said plurality of restriction data stored in said storing means represents any one of an aspect of the restriction of the maximum speed of the vehicle, an aspect of the restriction of the maximum acceleration of the vehicle, an aspect of the restriction of both the maximum speed and the maximum acceleration, and an aspect of the non-restriction of the maximum speed and the maximum acceleration.

7. A running performance control apparatus for use in an electric vehicle, wherein said running performance control apparatus restricts the running performance of the vehicle when capacity of a battery employed in the vehicle is reduced to preset residual capacity, said running performance control apparatus comprising:

battery capacity detecting means for detecting that said battery capacity is reduced to said preset residual capacity;

speed detecting means for detecting a speed of the vehicle while being driven;

acceleration detecting means for detecting an acceleration of the vehicle;

running state determining means for determining a vehicle running state based on the detected values from said speed detecting means and said acceleration detecting means;

shift position detecting means for detecting a shift position of a transmission of the vehicle;

accelerator opening detecting means for detecting a degree of opening of an accelerator of the vehicle;

operating state determining means for determining an operating state based on the detected values from said shift position detecting means and said accelerator opening detecting means;

storing means for storing therein a plurality of restriction data each used to restrict the running performance of the vehicle; and running performance controlling means for reading at least one restriction datum for restricting the running performance from said storing means based on information indicative of the running state determined by said running state determining means and on information indicative of the operating state determined by said operating state determining means when said battery capacity detected by said battery capacity detecting means is reduced to said preset residual capacity, and for restricting the running performance of the vehicle in response to said at least one restriction datum.

8. A running performance control apparatus according to claim 7, wherein said battery capacity detecting means comprises a depth-of-discharge sensor for detecting the depth of discharge of the battery and a converter circuit for converting the output of said depth-of-discharge sensor into data on the residual capacity of the battery.

9. A running performance control apparatus according to claim 8, wherein said converter circuit can detect a plurality of residual capacities of said battery which differ from one another.

10. A running performance control apparatus according to claim 7, 8, or 9, wherein said running state determining means comprises said speed detecting means and said acceleration detecting means.

11. A running performance control apparatus according to claim 7, 8, or 9, wherein said operating state determining means comprises said shift position detecting means and said accelerator opening detecting means.

12. A running performance control apparatus according to claim 7, 8, or 9, wherein each of said plurality of restriction data stored in said storing means represents any one of an aspect of the restriction of the maximum speed of the vehicle, an aspect of the restriction of the maximum acceleration of the vehicle, an aspect of the restriction of both the maximum speed and the maximum acceleration, and an aspect of the non-restriction of the maximum speed and the maximum acceleration.

13. A method of controlling the running performance of an electric vehicle having a battery and a transmission, when the capacity of the battery is reduced to a preset residual capacity, comprising the steps of:

detecting that the capacity of said battery is reduced to said preset residual capacity;

detecting a speed of the vehicle while being driven;

detecting an acceleration of the vehicle;

determining a vehicle running state based on the detected speed of the vehicle while being driven and the detected acceleration of the vehicle;

detecting a shift position of a transmission of the vehicle;

detecting a degree of opening of an accelerator of the vehicle;

determining an operating state of the vehicle based on the detected shift position and the detected degree of accelerator;

storing a plurality of restriction data each used to restrict the running performance of the vehicle;

selectively determining whether the running state of the vehicle should be restricted when said battery capacity is reduced to said preset residual capacity;

reading information indicative of said stored restriction data for restricting the running performance based on information indicative of the running state and on information indicative of the operating state when it has been selectively determined that the running state of the vehicle should be restricted; and restricting the running performance of the vehicle in response to the read information.

14. A method according to claim 13, wherein said detecting of the capacity of the battery includes detecting the depth of discharge of said battery and converting said detected depth-of-discharge into data on the residual capacity of the battery.

15. A method according to claim 14, wherein said converting step converts a plurality of residual capacities of said battery which differ from one another.

16. A method according to claim 13, 14, or 15, wherein each of said plurality of restriction data stored in said storing step represents any one of an aspect of the restriction of the maximum speed of the vehicle, an aspect of the restriction of the maximum acceleration of the vehicle, an aspect of the restriction of both the maximum speed and the maximum acceleration, and an aspect of the non-restriction of the maximum speed and the maximum acceleration.

17. A running performance control apparatus for use in an electric vehicle, wherein said running performance control apparatus restricts the running performance of the vehicle when capacity of a battery employed in the vehicle is reduced to a preset residual capacity, said running performance control apparatus comprising:

means for determining that said battery is reduced to said preset residual capacity;

means for detecting a speed of the vehicle while being driven;

means for detecting an acceleration of the vehicle;

running state determining means for determining a vehicle running state based on the detected speed of the vehicle and the detected acceleration of the vehicle;

means for detecting a shift position of a transmission of the vehicles;

means for detecting a degree of opening of an accelerator of the vehicle;

operating state determining means for determining an operating state of the vehicle based on the detected shift position and the detected degree of opening of the accelerator;

means for storing restriction data used to restrict the running performance of the vehicle; and control means for reading said restriction data from said storing means based on information indicative of the running state determined by said running state determining means and information indicative of the operating state determined by said operating state determining means when said battery capacity determined by said battery capacity determining means is reduced to said preset residual capacity, and for restricting the running performance of the vehicle in response to said restriction data.

18. A running performance control apparatus according to claim 17, wherein means are provided for a driver of the vehicle to selectively prevent the restriction on the running performance of the vehicle.

19. A running performance control apparatus according to claim 17 wherein said restriction data stored in said storing means represents any one of an aspect of the restriction of the maximum speed of the vehicle, an aspect of the restriction of the maximum acceleration of the vehicle, an aspect of the restriction of both the maximum speed and the maximum acceleration, and an aspect of the non-restriction of the maximum speed and the maximum acceleration.

20. A running performance control apparatus according to claim 19, wherein means are provided for indicating to a driver of the vehicle which said aspect of the restriction on the running of the vehicle has been imposed by said control means.

21. A running performance control apparatus according to claim 20, wherein means are provided for the driver to selectively prevent the restriction on the running performance of the vehicle.

* * * * *